United States Patent Office 3,654,215
Patented Apr. 4, 1972

3,654,215
FILLER CROSS-LINKED POLYSILOXANES
John C. Goossens, Scotia, N.Y., assignor to
General Electric Company
No Drawing. Filed Dec. 26, 1967, Ser. No. 693,074
Int. Cl. C08g 51/04
U.S. Cl. 260—37 SB                                    8 Claims

ABSTRACT OF THE DISCLOSURE

Polysiloxane chains are cross-linked through filler particles. The cross-linked polysiloxanes are prepared by reacting SiH-containing polysiloxane chains with silanol-containing filler in the presence of a platinum-containing catalyst. The compositions of the present invention are useful as an elastic interlayer between glass panes in a safety glass laminate.

In the past, many methods have been employed to cross-link organopolysiloxane chains to produce elastomeric or resinous products. These methods generally involve either a free radical cross-linking of the polysiloxane chains or an addition of a polyfunctional molecule which is reactive with the polysiloxane chains.

The free radical method of cross-linking polysiloxane chains involves either the addition of a free radical generating reagent, such as benzoyl peroxide, or the irradiation of the organopolysiloxane with high energy particles. Either method involves some degradation of the polymer and when a free radical generating reagent is added such as benzoyl peroxide, foreign residues remain in the product and the product is rendered less oxidatively and hydrolytically stable.

When a polyfunctional cross-linking agent is employed it is, generally speaking, either an organofunctional material or a material which will react with the polysiloxane to form a cross-linked polysiloxane and a by-product. When an organofunctional cross-linking agent is employed, the product contains carbon-to-carbon bonds which break down upon exposure to ultraviolet light. When a by-product forming polyfunctional cross-linking agent is employed, the by-product formed is usually an acid, a base or a salt. The by-product formed has no beneficial effect on the cross-linked product and often has harmful effects upon the product and corrosive effects upon materials used in conjunction with the product.

I have unexpectedly discovered that the cross-linking methods of the prior art need not be employed and that a polysiloxane can be cross-linked directly through a filler. This is accomplished by reacting a polysiloxane containing silanic hydrogen with a filler containing silanol groups in the presence of a platinum-containing catalyst.

The organopolysiloxanes which are convertible to the cured, solid, elastic state are known in the art and contain 0.001 to 0.02 silanic hydrogen atoms per diorganosiloxy unit and 1.98 to 2.00 organic groups per silicon atom. These organopolysiloxanes can be obtained by hydrolyzing a diorganodihydrolyzable silane, for example, dimethyldichlorosilane, with a small amount of monoorganodihydrolyzable silane, such as methyldichlorosilane, and with or without small amounts of a triorganomonohydrolyzable silane, for example, trimethylchlorosilane, dimethylchlorosilane, etc., and thereafter effecting condensation of the hydrolysis product using a condensing agent, for instance, a metal soap such as tin octoate or an acidic condensing agent, such as ferric chloride, calcium acid sulfate, etc. Alternately, cyclic dimethylsiloxanes and cyclic organosiloxanes containing silanic hydrogen can be rearranged with an alkaline or acid catalyst to give the desired organopolysiloxane which is convertible to the cured, solid and, if preferred, elastic state.

The preferred organopolysiloxanes used in the practice of the present invention are gums which have a number of silanic hydrogen-containing siloxy groups per molecule and each silanic hydrogen-containing siloxy group is separated by 250 to 700 diorganosiloxy units. The ratio of silanic hydrogen atoms to diorganosiloxy units in the preferred organopolysiloxane is from 0.0014 to 0.004. The organopolysiloxane gums having the spaced silanic hydrogen groups are made by the reaction of a silanol-stopped polydiorganosiloxane with a silane containing one silanic hydrogen, one organo group and two hydrolyzable radicals. The process is described in my copending application Ser. No. 452,919 filed May 3, 1965, entitled "Organosilicon Materials and Method of Making Them."

The organo groups of the silanol-stopped polydiorganosiloxane and the hyrolyzable silane and consequently the organo groups appearing on the final polydiorganosiloxane product are selected from the class consisting of alkyl radicals, such as methyl, ethyl, propyl, isopropyl, butyl, isobutyl, hexyl, heptyl, octyl, etc.; cycloalkyl, such as cyclohexyl, cycloheptyl, etc.; aryl, such as phenyl, tolyl, naphthyl, etc.; aralkyl, such as phenylethyl, benzyl, etc.; halogenated derivatives of the above radicals, such as chloroethyl, trifluoropropyl, tetrafluorobutyl, perchlorophenyl, etc.; and cyanoalkyl radicals, such as cyanoethyl, cyanopropyl, cyanobutyl, cyanopentyl, etc.

It is essential to the practice of the present invention that a silanol-containing filler be present, as it is through the filler that the cross-linking of the silanic hydrogen-containing organopolysiloxane takes place. In general, any filler system which contains silanol groups attached to silica or a silicate can be employed. Among the better fillers are the finely divided silica fillers generally used for silicone rubber such as silica aerogel, fumed silica, and silica treated with a cyclic diorganosiloxane wherein the organo groups are selected from the same class as those of the aforementioned organopolysiloxanes. The preferred cyclopolysiloxanes are the cyclotrisiloxane and the cyclotetrasiloxane, and the preferred organo substituent is methyl. Ground quartz, ground glass, and chopped glass fibers may also be used. The preferred filler is fumed silica treated with octamethylcyclotetrasiloxane. The amount of filler present can vary within wide limits, e.g., from 10 to 300 parts of filler per 100 parts of the organopolysiloxane gum. Preferably, the filler is present in an amount of from 25 to 100 parts per 100 parts of the organopolysiloxane gum. Up to about ⅔ of the total silica filler may be replaced with diatomaceous earth or an alkaline clay.

The platinum-containing catalysts which can be used include any of the platinum metal or platinum compound catalysts generally utilized in SiH-olefin addition reactions.

Among the many useful catalysts for this reaction are finely divided platinum as described in Patent 2,970,150—Bailey, chloroplatinic acid as described in Patent 2,823,-218—Speier et al., the reaction product of chloroplatinic acid with either an alcohol, an ether, or an aldehyde as described in Patent 3,220,972—Lamoreaux, trimethylplatinum iodide and hexamethyl diplatinum as described in Patent 3,313,773—Lamoreaux, and the platinum-olefin complex catalysts as described in Patents 3,159,601 and 3,159,662 of Ashby. In general, amounts of from 0.01 to 250 parts per million by weight as platinum, based on the total weight of curable composition present, can be used. Preferably, the amount is from 0.1 to 10 p.p.m. as platinum based on the organopolysiloxane. The platinum-containing catalyst can be employed in amounts greater than 250 parts per million, but due to the cost of the materials, utilization of greater than 250 parts per million is not preferred.

The concentration of catalyst required to cross-link a polysiloxane containing silanic hydrogen through a silanol-containing filler has been found to be greater than the minimum required to catalyze most SiH-olefin addition reactions.

When it is desired to formulate the composition of the present invention at one time, store the formulation and then use the formulation at a later date; or to formulate the curable composition, ship to a distant site and then cure the formulation, it is desirable to inhibit the catalyst. The catalyst can be inhibited by refrigeration to below 0° C. When an inhibited catalyst system is employed in the practice of the present invention, lower concentrations of the catalyst in the curable compositions are used.

As the activity of platinum catalyst depends upon the catalyst composition, the storage time of curable compositions with each catalyst used will usually be determined individually by a person skilled in the art before any large scale inhibited systems are formulated.

In combination with the refrigeration or in lieu thereof, a volatile halocarbon inhibitor may be added to the composition of the present invention. Halocarbons which may be used are selected from the class consisting of halocarbons having 2 carbon atoms and at least 3 halogen atoms per molecule wherein the halogen atoms are selected from the class consisting of fluorine, chlorine and bromine. The preferred inhibitor is perchloroethylene, but trichloroethylene and 1,2-difluoro-1,1,2,2-tetrachloroethane are also good inhibitors. The inhibitors are used in an amount of 6% to 85% by weight of the total composition.

The order of addition of the various components of the composition of the present invention is immaterial. All can be added simultaneously, or the filler, catalyst, and inhibitor, when it is present, can be added at various times to the silanic hydrogen-containing organopolysiloxane and a homogeneous blend obtained. Following blending of the various materials, the curable composition can be allowed to cure or can be stored in a refrigerated state, or if a halocarbon inhibitor has been added, the composition may be stored in a sealed container until it is desired that a cure be effected. Curing of the halocarbon inhibited composition is accomplished by evaporating the inhibitor and allowing the cure to take place.

The practice of the present invention will now be more fully illustrated. These illustrations should not be considered as limiting in any way the full scope of the present invention as covered by the appended claims.

The filler which was used in the following examples was Cab-O-Sil H–5 which is a fumed silica having a particle size of 10 to 15 millimicrons, a surface area of 325 square meters per gram, and a silanol content of 1.65 milliequivalents per gram.

The catalyst which was used in the following examples is a coordination compound of platinum referred to hereinafter as platinum coordinate. The platinum coordinate is a reaction product of chloroplatinic acid and octyl alcohol. The preparation of the catalyst is disclosed in Example 1 of U.S. Patent 3,220,972—Lamoreaux. The platinum coordinate catalyst produced by following Example 1 of that patent is dissolved in 1000 times its weight of toluene to produce the platinum coordinate catalyst solution used in the following examples. Chemical analysis of this solution showed it to contain 35 parts per million by weight of platinum as metal based upon the total weight of the catalyst solution.

EXAMPLE 1

A composition was formulated containing 100 parts of a gum having the average formula:

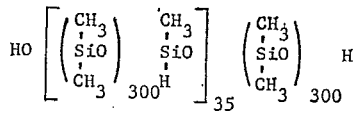

and 30 parts of Cab-O-Sil H–5 filler which had been treated with 30 parts of octamethylcyclotetrasiloxane. Sufficient platinum coordinate catalyst solution was added to provide 0.1 p.p.m. by weight of platinum based upon the weight of the curable composition. The composition was press-cured at 10,000 p.s.i. and 100° C. for 30 minutes, then subjected to a 175° C. overnight post-bake. The product had a tensile strength of 1030 p.s.i. and an elongation of 345%.

EXAMPLES 2 THROUGH 9

The effect of varying the amount of filler present in the composition is demonstrated by these examples. The compositions were formulated containing 100 parts of a gum having the average formula:

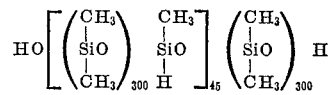

In each of the following examples, Cab-O-Sil H–5, which had been treated with octamethylcyclotetrasiloxane, was used. Sufficient platinum coordinate catalyst solution was added to provide 0.1 p.p.m. by weight of platinum based upon the weight of the curable composition. The samples were press-cured at 10,000 p.s.i. and 100° C. for one-half hour, followed by a 16 hour post-cure. The results are tabulated below:

TABLE I

| Example | Parts filler | Tensile strength (p.s.i.) | Elongation (percent) |
| --- | --- | --- | --- |
| 2 | 10 | 86 | 140 |
| 3 | 20 | 440 | 335 |
| 4 | 30 | 720 | 350 |
| 5 | 40 | 1,045 | 325 |
| 6 | 50 | 1,098 | 280 |
| 7 | 60 | 865 | 175 |
| 8 | 70 | 900 | 120 |
| 9 | 80 | 830 | 95 |

EXAMPLE 10

A composition was formulated containing 100 parts of a gum having the average formula:

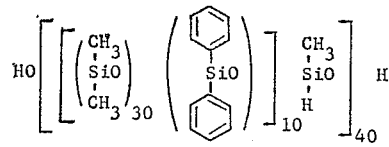

and Cab-O-Sil H–5 which had been treated with octamethylcyclotetrasiloxane. Sufficient platinum coordinate catalyst solution was added to provide 0.1 p.p.m. by weight of platinum based upon the weight of the curable composition. The composition was molded under a 10,000 p.s.i. pressure at room temperature. After 4 days, dumbbells cut from the molded sheet of elastomer had a tensile strength of 605 p.s.i. and an elongation of 700%. After 10 days, dumbbells cut from the sheet had a tensile strength of 815 p.s.i. and an elongation of 540%. After 14 days, dumbbells cut from the sheet had a tensile strength of 975 p.s.i. and an elongation of 555%.

EXAMPLE 11

The filler used in the following example was prepared by treating Cab-O-Sil H–5 with trimethylisopropylaminosilane to react with the silanol groups contained on the silica. A composition was formulated containing 100 parts of a gum having the formula:

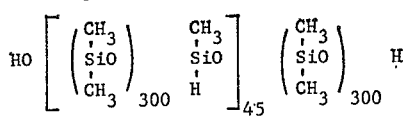

and 40 parts of the treated filler described above. Sufficient platinum coordinate catalyst solution was added to provide 0.1 p.p.m. by weight platinum based upon the weight of the curable composition. The composition was pressed at 10,000 p.s.i. and 100° C. for 30 minutes, then subjected to 150° C. overnight post-bake. The composition did not cure, thus indicating that cure takes place through the silanol groups on the silica filler.

EXAMPLE 12

A composition was formulated containing 100 parts of a gum having the average formula:

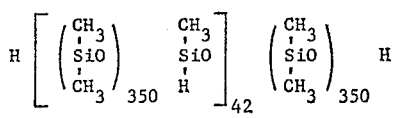

and 50 parts of Cab-O-Sil H-5 filler which had been treated with octamethylcyclotetrasiloxane. Sufficient platinum coordinate catalyst solution was added to provide 0.1 p.p.m. by weight of platinum based upon the weight of the curable composition. The composition was press-cured at 10,000 p.s.i. at 100° C. for 30 minutes and then subjected to a 16 hour 175° C. post-bake. The product had a tensile strength of 1100 p.s.i. and an elongation of 420%.

EXAMPLE 13

A composition was formulated containing 100 parts of a gum having the average formula:

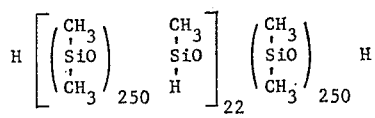

and 20 parts of Cab-O-Sil H-5 filler which had been treated with octamethylcyclotetrasiloxane. Sufficient platinum coordinate catalyst solution was added to provide 0.1 p.p.m. by weight of platinum based upon the weight of the curable composition. The composition was used to coat a flat glass plate 12 inches square and 1/8" thick. The coating was 10 mils thick. A second plate of glass was placed over the coated plate. The laminate formed was cured at room temperature for 4 days in a press under 100 p.s.i. pressure.

The laminate formed was an excellent safety glass. The safety glass was broken by a violent impact with a hammer and the individual splinters of broken glass did not break loose from the 10 mil thick silicone interlayer. Upon subsequent inspection of the smashed safety glass, it was found that the glass splinters were firmly bonded to the silicone interlayer.

EXAMPLES 14 THROUGH 17

The following examples show the results obtained when mixed filler systems are employed in the practice of the present invention. One of the fillers used in the following was Cab-O-Sil H-5 which had been treated with octamethylcyclotetrasiloxane. The second filler of the mixed filler system used in the following examples consisted of Cab-O-Sil H-5 which had been treated with trimethylisopropylaminosilane.

The compositions were formulated containing 100 parts of a gum having the average formula:

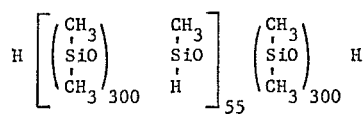

50 parts of a combination of the above-described silica fillers and sufficient platinum coordinate catalyst solution was added to provide 0.1 p.p.m. by weight of platinum based upon the weight of the curable composition. The compositions were press-cured at 10,000 p.s.i. and 100° C. for 30 minutes. The fillers used in the various compositions and the results obtained are tabulated below.

TABLE II

| Example | Parts of trimethylisopropyl-aminosilane treated filler | Parts of octamethylcyclotetra-siloxane treated filler | Tensile strength (p.s.i.) | Elongation (percent) |
|---|---|---|---|---|
| 14 | 10 | 40 | 1,273 | 475 |
| 15 | 20 | 30 | 1,107 | 420 |
| 16 | 30 | 20 | 860 | 527 |
| 17 | 40 | 10 | 1,050 | 735 |

EXAMPLE 18

A composition was formulated containing 100 parts of a gum having the average formula:

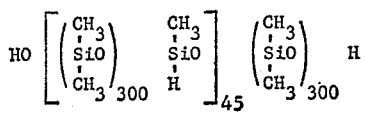

50 parts of Cab-O-Sil H-5 which has been treated with trimethylisopropylaminosilane and 20 parts Cab-O-Sil H-5 which has been treated with octamethylcyclotetrasiloxane. Sufficient platinum coordinate catalyst solution was added to provide 0.1 p.p.m. by weight of platinum based upon the weight of the curable composition. The composition was press-cured at 10,000 p.s.i. and 100° C. for 30 minutes. The product had a tensile strength of 957 p.s.i. and an elongation of 520%.

EXAMPLE 19

A composition was formulated containing 100 parts of a gum having the average formula:

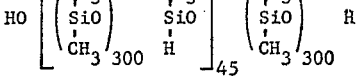

and 40 parts of untreated Cab-O-Sil H-5. Sufficient platinum coordinate catalyst solution was added to provide 0.1 p.p.m. by weight of platinum based upon the weight of the curable composition. The composition was press-cured at 10,000 p.s.i. at 100° C. for 30 minutes and post-cured at 250° C. for 16 hours. The product had a tensile strength of 685 p.s.i. and an elongation of 328%.

What I claim as new and desire to secure by Letters Patent of the United States is:

1. A curable composition consisting essentially of (1) 100 parts of an organopolysiloxane convertible to the cured, solid state and consisting essentially of silicon atoms, oxygen atoms, hydrogen atoms, and monovalent organic groups free of olefinic unsaturation selected from the class consisting of alkyl radicals, cycloalkyl radicals, aryl radicals, aralkyl radicals, halogenated derivatives of the above organic radicals and cyanoalkyl radicals, there being from 1.98 to 2.00 organic groups per silicon atom, and from 0.001 to 0.02 silanic hydrogen atoms per silicon atom, (2) a finely divided silanol-containing filler in an amount of from 10 to 300 parts, by weight, and (3) a platinum-containing catalyst in an amount from 0.01 p.p.m. to 250 p.p.m. by weight of platinum as metal based on the total weight of the curable composition.

2. The cured product of claim 1.

3. The composition of claim 1 wherein the filler is present in an amount from 25 to 100 parts.

4. The composition of claim 1 wherein the platinum-containing material is present in a range to provide from 0.1 to 10 p.p.m. of platinum by weight based upon the total weight of curable composition.

5. The composition of claim 1 wherein the inorganic filler is selected from the class consisting of untreated fumed silica and fumed silica treated with a cyclodiorganopolysiloxane.

6. The composition of claim 1 wherein the ratio of silanic hydrogen atoms to the diorganosiloxy units is from 0.0014 to 0.004.

7. A method of making cured, solid polysiloxanes which comprises reacting an organopolysiloxane consisting essentially of silicon atoms, oxygen atoms, hydrogen atoms and monovalent organic groups free of olefinic unsaturation selected from the class consisting of alkyl radicals, aryl radicals, aralkyl radicals, halogenated derivatives of the above radicals and cyanoalkyl radicals, there being from 1.98 to 2.00 organic groups per silicon atom and from 0.02 to 0.001 silanic hydrogen atoms per silicon atom, with a silanol-containing filler selected from the class consisting of silica, silica treated with a cyclic diorganosiloxane wherein the organo groups are free of olefinic unsaturation, ground glass and chopped glass fibers in the presence of a platinum-containing catalyst in an amount from 0.01 p.p.m. to 250 p.p.m. by weight, based on the organopolysiloxane of platinum.

8. The method as described in claim 7 wherein the filler is silica which has been treated with octamethylcyclotetrasiloxane.

References Cited
UNITED STATES PATENTS

| | | | |
|---|---|---|---|
| 3,061,577 | 10/1962 | Pruett | 260—41 A |
| 2,967,171 | 1/1961 | Barnes et al. | 260—46.5 H |
| 3,330,797 | 7/1967 | Kelly et al. | 260—37 SI |

LEWIS T. JACOBS, Primary Examiner